(12) United States Patent
Sooferian

(10) Patent No.: US 9,964,286 B1
(45) Date of Patent: *May 8, 2018

(54) COLOR CHANGING FOCUS LIGHT

(71) Applicant: Danny H. Sooferian, Camarillo, CA (US)

(72) Inventor: Danny H. Sooferian, Camarillo, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 14/605,090

(22) Filed: Jan. 26, 2015

Related U.S. Application Data

(63) Continuation-in-part of application No. 14/492,474, filed on Sep. 22, 2014, now abandoned, which is a continuation of application No. 13/762,061, filed on Feb. 7, 2013, now Pat. No. 8,840,273.

(60) Provisional application No. 61/931,434, filed on Jan. 24, 2014, provisional application No. 61/597,044, filed on Feb. 9, 2012.

(51) Int. Cl.
| *F21V 14/08* | (2006.01) |
| *F21V 9/10* | (2006.01) |
| *F21V 13/02* | (2006.01) |
| *F21V 23/02* | (2006.01) |
| *F21V 19/02* | (2006.01) |

(52) U.S. Cl.
CPC ............... *F21V 14/08* (2013.01); *F21V 9/10* (2013.01); *F21V 13/02* (2013.01); *F21V 19/02* (2013.01); *F21V 23/02* (2013.01)

(58) Field of Classification Search
CPC . F21V 14/08; F21V 9/10; F21V 13/02; F21V 19/02; F21V 23/02
See application file for complete search history.

(56) References Cited

U.S. PATENT DOCUMENTS

| 4,987,523 A * | 1/1991 | Lindabury | F21L 7/00 362/188 |
| 5,838,860 A * | 11/1998 | Kingstone | F21V 29/74 385/100 |
| 6,877,876 B1 * | 4/2005 | Steinhilber | F21V 14/025 362/187 |
| 7,293,893 B2 * | 11/2007 | Kim | F21V 5/008 362/184 |
| 2005/0083687 A1 * | 4/2005 | Brass | G01N 21/31 362/231 |
| 2009/0091925 A1 * | 4/2009 | Hesse | F21L 4/04 362/187 |
| 2011/0075406 A1 * | 3/2011 | Hesse | F21L 4/04 362/187 |

* cited by examiner

*Primary Examiner* — Mary Ellen Bowman
(74) *Attorney, Agent, or Firm* — Colin P. Abrahams

(57) ABSTRACT

A light fixture comprising a lens frame, a lens on the lens frame, and a movable plate comprising at least two apertures each having a color filter in at least a portion of the aperture. The movable plate is movable so that one aperture thereof is selectively associated with the lens. A light source is provided, and the lens and light source are movable relative to each other between a first position in which the lens and the light source are nearer each other and a second position in which the lens and light source are further away from each other, wherein light produced by the light fixture is more focused or more diffuse according to the relative positions of the lens and the light source.

16 Claims, 13 Drawing Sheets

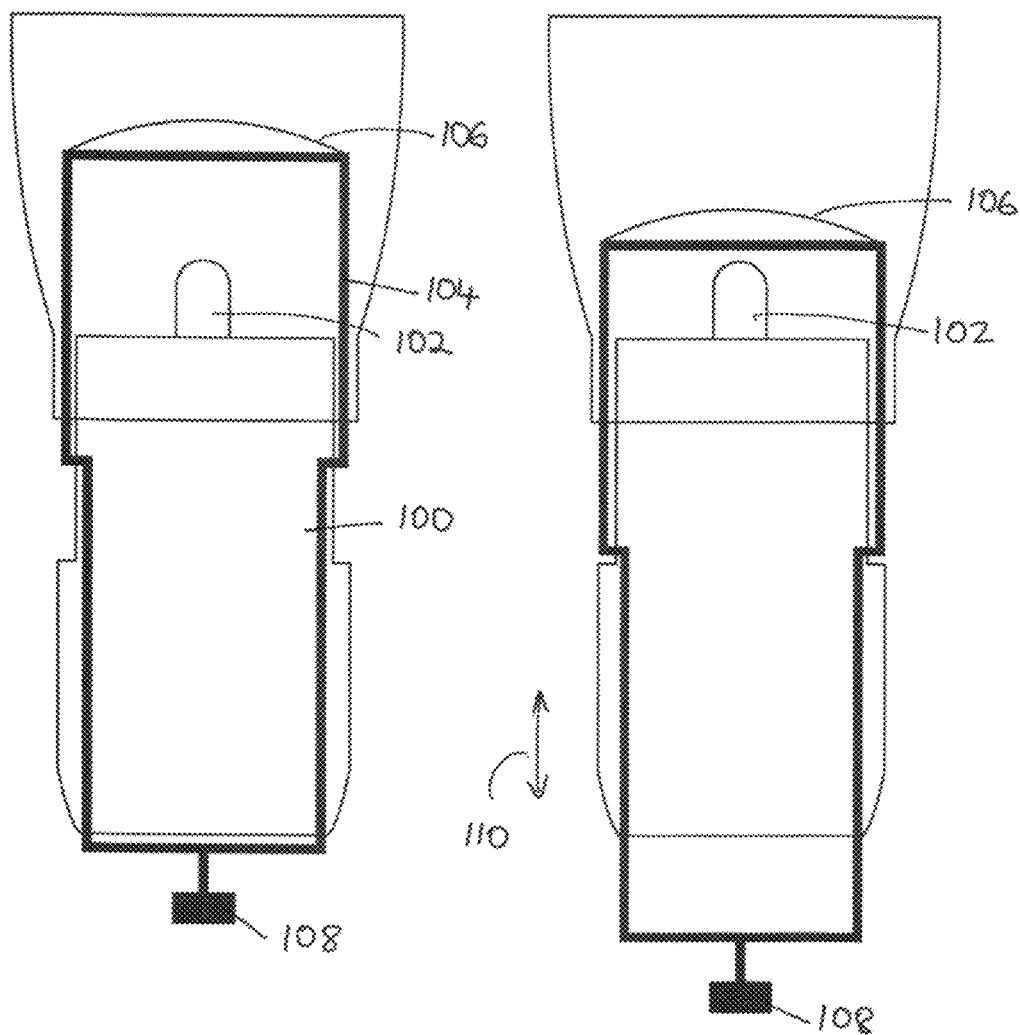

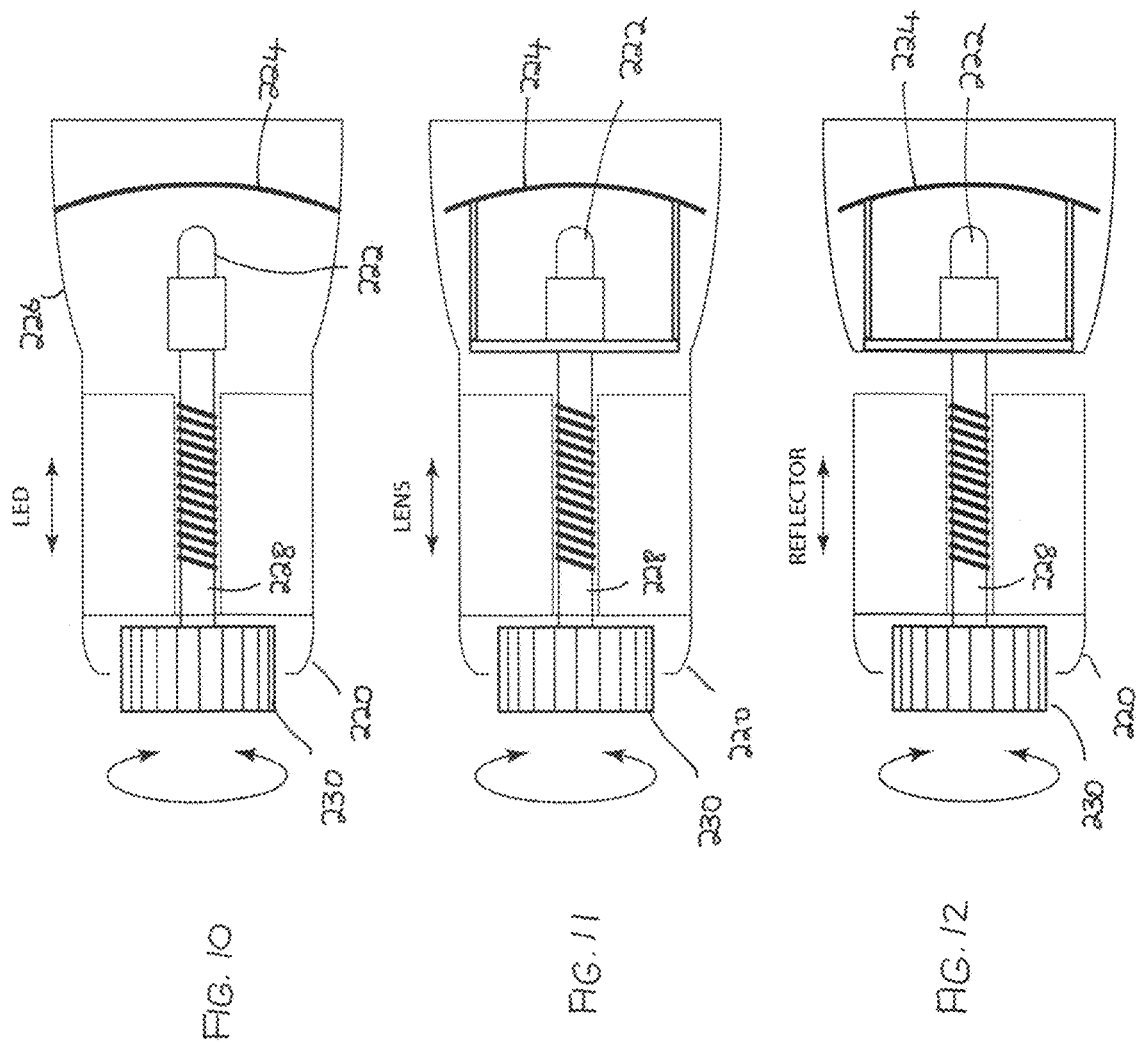

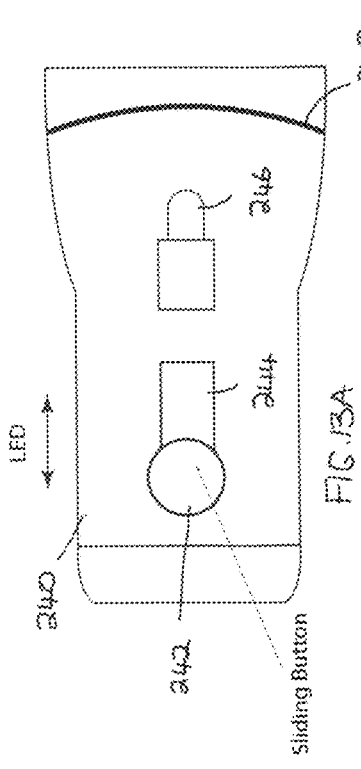
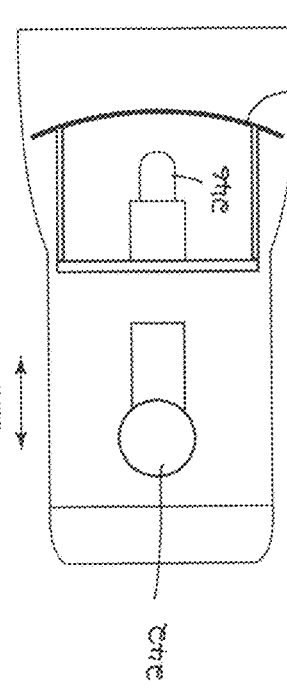
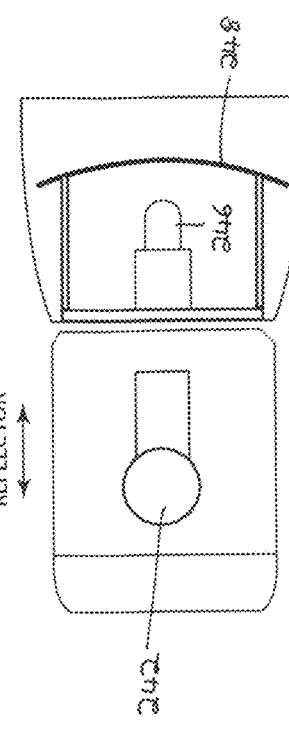
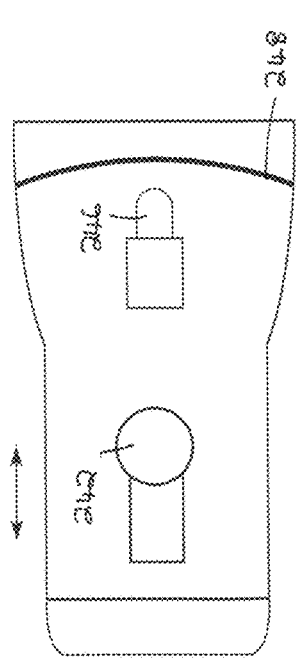
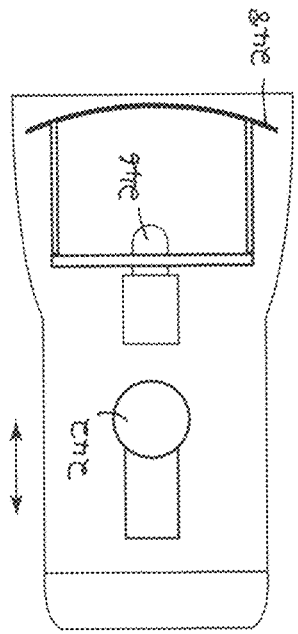
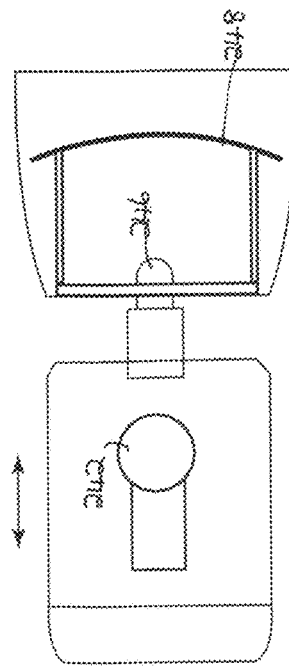

COLOR CHANGING FOCUS LIGHT

CROSS-REFERENCE TO RELATED APPLICATIONS

This application claims the benefit of U.S. Provisional Patent Application No. 61/931,434 filed Jan. 24, 2014, the contents of which are incorporated herein by reference in their entirety. Further, this application is a continuation in part application of U.S. patent application Ser. No. 14/492,474 filed Sep. 22, 2014, which is a continuation of U.S. patent application Ser. No. 13/762,061 filed Feb. 7 2013, which claims the benefit of Provisional Patent Application No. 61/597,044 filed Feb. 9, 2012, all of which are incorporated herein by reference in their entirety.

FIELD AND BACKGROUND OF THE INVENTION

This invention relates to a color changing lamp. More particularly, the invention provides for a lamp wherein the light source is able to transmit through different color filters through a filtering mechanism constructed as part of the light, so that the color of the light emanating from the color changing lamp can be selectively varied according to preference and situation. The color changing lamp of the invention may also talk optionally include an adjustable focus light or lamp, so that the lamp or light fixture can be adjusted so as to selectively provide either a more focused beam to illuminate a smaller area, or a less focused beam to provide more general area lighting, the light so generated being of a different selected color or colors.

SUMMARY OF THE INVENTION

According to one aspect of the invention, there is provided a light fixture comprising: a lens frame, a lens on the lens frame, a movable plate comprising at least two apertures each having a color filter in at least a portion of the aperture, the movable plate being movable so that one aperture thereof is selectively associated with the lens, and a light source, the lens and light source being movable relative to each other between a first position in which the lens and the light source are nearer each other and a second position in which the lens and light source are further away from each other, wherein light produced by the light fixture is more focused or more diffuse according to the relative positions of the lens and the light source.

In one embodiment, the movable plate comprises a circular disk rotatably mounted at its center whereby rotation of the circular disk facilitates selective placement of an aperture at the lens. The circular disk may comprise three apertures, each aperture having therein a filter of a different color. Preferably, the circular disk has a textured edge to facilitate manual rotation of the circular disk. In one embodiment, the lens frame comprises an outer housing having a slot therein, and a portion of the circular disk extends a short distance through the slot so that the circular disk can be rotated from outside of the outer housing.

A fixing mechanism may be positioned so that a selected aperture is probably located in front of the lens.

In one embodiment, a motor for moving the movable plate is provided so that a selected aperture is associated with the lens. The motor may be remotely operable so that the movable plate can be moved to a selected position from a remote location. Further, a control circuit may be provided for activating the motor to move the movable plate so that a selected aperture is associated with the light source for a programmed period of time.

In one embodiment, a plurality of light sources are provided each of which may be independently and separately moved relative to the lens, and wherein one or more of the plurality of light sources may have a movable disk associated there with.

According to a further aspect of the invention, there is provided a light fixture comprising: a lens frame, a lens on the lens frame, a light source which shines light through the lens, and a movable plate comprising at least two apertures each having a color filter in at least a portion of the aperture, the movable plate being movable so that one aperture thereof is selectively associated with the lens.

In one embodiment, the light fixture the movable plate comprises a circular disk rotatably mounted at its center whereby rotation of the circular disk facilitates selective placement of an aperture at the lens. In one form, the lens frame comprises an outer housing having a slot therein, and a portion of the circular disk extends a short distance through the slot so that the circular disk can be rotated from outside of the outer housing.

According to a further aspect of the invention, there is provided a method of adjusting the color and focus of a beam in a light fixture comprising the steps of mounting a lens frame having a lens and a light source relative to each other, positioning in front of the light source a movable plate having apertures containing filters of different colors, and moving the lens and light source relative to each other between a first position in which the lens and the light source are nearer each other and a second position in which the lens and light source are further away from each other, wherein light produced by the light fixture is more focused or more diffuse according to the relative positions of the lens and the light source.

Therefore, according to one aspect of the invention, there is provided a color changing light comprising a housing, the housing having an illumination source, and a color filter so that the color of the light emanating from the illumination source can be selectively varied by the user. The color changing light of the invention may have a colorful so which is comprised of a rotating disk, the disc having a plurality of apertures, each of the apertures being fitted with a color filter, the disc being rotatable so that a particular aperture with a specific color filter is placed in front of the illumination source.

The housing preferably comprises a chamber for accommodating various pieces of hardware such as the illumination source, a front panel, and a hood or cover. In one form of the invention, the rotating disk is placed on the front panel. Preferably, the housing has access means whereby the rotating disk can be accessed from outside of the housing so that rotation thereof can be effected so as to change the color of the light emanating from the lamp.

In a preferred form of the invention, the light is at least partially powered by solar energy collectors, which collect energy for storage in a rechargeable battery. Other sources of power may also be used.

The color filter may be movable and adjustable by means of a motorized device, which may be operated from outside of the housing, and may also be operated by a wireless remote system. The lamp of the invention may also include motion sensors, processes, light sensors, as well as other hardware for providing the light with different options and operations.

According to one aspect of the invention, there is provided a color changing light fixture comprising a lens frame, a lens on the lens frame and a light source, the lens and light source being movable relative to each other between a first position in which the lens and the light source are nearer each other and a second position in which the lens and light source are further away from each other, a color filter mechanism for changing the color of the light emanating from the light fixture, wherein light produced by the light fixture is more focused or more diffuse according to the relative positions of the lens and the light source. In various embodiments: the lens is movable and the light source is stationary; the light source is movable and the lens is stationary; and both the lens and the light source or movable relative to each other.

The light in accordance with the present invention may be used either indoors or outdoors. Moreover, the light may be powered in a conventional fashion through use of an AC outlet or using the battery, or it may be powered by solar energy, especially when located outdoors, and may be positioned so as to advantageously capture and use solar power. Moreover, the lamp or light fixture may be powered by a combination of any one of the above.

The invention therefore, in one aspect, may comprise a light source mounted within a housing, and an adjustable lens associated with the light source so that the light emanating from the light source can be focused or unfocused to provide different forms or effects of light and illumination. When unfocused, the light from the light source may typically provide general flood lighting for illuminating a larger area, and when focused, the light from the light source may provide spotlighting or directed lighting in order to illuminate a smaller and a more specific area. The color of the illumination can be varied by selecting a desired color filter.

In another aspect of the invention, it is the light source itself that may be adjustable, so as to move nearer to or further away from the lens to focus the light emanating therefrom in a variety of different manners.

The housing of the lamp or light fixture may include reflective means, such as a mirror, for reflecting and enhancing upon the amount of light which may be produced by the light fitting. The reflective means may be movable, as described above, and may be of any suitable shape or dimension. Further, the reflective means may be comprised of two or more components which may move relative to each other to differently reflect the light from the light source, thereby allowing different degrees of focusing. The reflective means, or its components where applicable, may also be resilient or malleable so as to assume different shapes.

The adjustable lens, light source or reflector may take many different forms, and may be positioned relative to each other in a variety of different manners and embodiments. For example, the adjustable lens may be fixed within a frame or bracket, the frame or bracket being adjustably connected to the remainder of the light fixture so that movement thereof will adjust and vary the focus of the light beam produced.

It should be noted that the adjustable lens, the light source or the reflector may be positioned at any point between the focused and unfocused location so that any desired form of light which may fall between the flood lighting and spotlighting extremes can be achieved. Therefore, small adjustments to the position of the lens, light source and or reflector are possible, and either one or more of these components may be fixed to the housing in a manner whereby each or more than one will be securely positioned at the desired point to provide the preferred light, without moving or shifting under normal conditions.

In one embodiment, the frame or bracket in which the lens, light source or reflector is contained may be threaded and connected to the housing around the light source. In another embodiment, the frame or bracket may be mounted so that it can slide or telescope forward and backward relative to the light source, lens or reflector to provide the desired beam.

In another form of the invention, the lens and the frame in which it is contained may have a mechanism whereby the position of the lens can be easily adjusted, such as by a handle, knob, or other physical mechanism. Such adjustment may be possible in certain embodiments by placing the adjustment mechanism outside of the housing so that it can be easily accessed. Additionally, the lens (or another of the components controlling focus) may be adjustable by a motor, and, in one form of the invention, the motor may be remotely operable so that the position of the lens can be adjusted without having to be right at the light fitting itself.

The invention therefore provides a mechanism for lighting which can vary between a spotlight providing a narrow beam of light and a floodlight which provides a wider beam of light. A mix of the two also fall within the scope of the invention. In various embodiments, the light source moves, the lens moves, or and optional reflector may move, or combination thereof may move, to provide the desired effect.

There may be a single light source, which is preferably an LED, or a plurality of light sources. The different LEDs may have different angles of deflection. Further, each of the light sources or LEDs may be mounted independently of each other and may be independently adjustable. For example, if there are two light sources, both may be in the focused mode, both may be in the wide beam mode, or one may be focused and the other wide beam. In another example, there may be three light sources, all independently movable, and each light source may be differently focused, such as wide beam, narrow beam, and intermediate beam. It will be appreciated that there are many different combinations and permutations within the scope of the invention.

In one embodiment, a single dial or other controller may simultaneously move the lens in one direction and the light source in another direction.

BRIEF DESCRIPTION OF THE DRAWINGS

In the drawings:

FIGS. 6A and 6B show a lens frame fitted to a light fitting in accordance with yet a further embodiment of the present invention;

FIGS. 10, 11 and 12 show schematic side views of a light fitting of the invention wherein a dial and screw threaded component respectively move the light source, lens and reflector;

FIGS. 13A and 13B show schematic side views of a light fitting of the invention including a sliding button for moving the position of the light source;

FIGS. 14A and 14B show schematic side views of a light fitting of the invention including a sliding button for moving the position of the lens; and FIGS. 15A and 15B show schematic side views of a light fitting of the invention including a sliding button for moving the position of the reflector;

DETAILED DESCRIPTION OF THE DRAWINGS

Reference is now made to the attached drawings which illustrate a lens, lens frame, reflector and a light fitting constructed with a lens of the present invention. It is to be noted that the present invention may constitute the lens itself, which may be associated with a lens frame, independent of the light fitting, and which may be selectively placed on the light fitting. The present invention also covers the light fitting with a lens or lens and frame attached thereto.

It is a feature of the invention that any one of the lens, light source or reflector when present, when associated with the light fitting is movable relative to the light source of the light fitting, and is located on the light fitting in a position adjacent to or near this light source. In this specification, any reference to or description of the movability of the lens should be understood to mean that corresponding embodiments may be provided in which the light source and/or reflector are similarly or correspondingly movable instead of, or in addition to, the lens, or the reflector and light source respectively.

In one embodiment, the lens is movable from a first position in which it is closer to the light source such that light from the light source is diffused or dispersed at least to some extent so as to provide general lighting or flood lighting. The lens is movable from the first position to a second position wherein the lens is situated further from the light source such that light from the light source is more focused into a more concentrated beam so that a spotlight is provided, whereby a more specific target or area can be illuminated. Furthermore, the lens may be located anywhere between the first and second positions so that the light from the light source may have varied focus according to the selected position.

Therefore, the lens is not confined to being in either the first or the second position. The lens may be also located at any point which is intermediate these two positions or extremes, so that a light beam or lighting effect of the desired type may be achieved by selecting any intermediate position for the lens. This desired type of light may be anything between the range of a focused spotlight and a more generally diffused floodlight, as already described.

Some of the attached drawings illustrate mechanisms by means of which the lens and its lens frame (or, correspondingly, the light source at its base or the reflector and its base) can be associated with the light fitting in a manner which will facilitate the movement between the first and second positions. There are many different ways of constructing the lamp and associated lens to permit the relative movement therebetween. The examples provided in the present application are not intended to be limiting, but only exemplify the broad range and nature of such construction which will fall within the scope of the invention.

Figure 1:
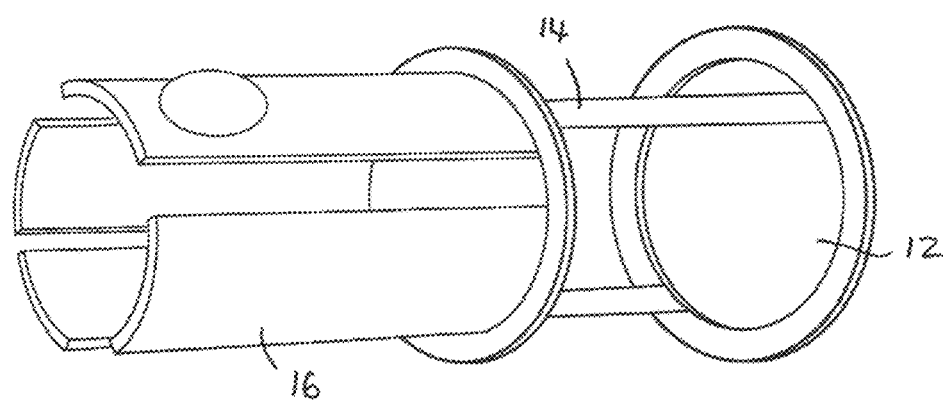
FIG. 1 is a perspective view of a lens and frame in accordance with one aspect of the invention.

In FIG. 1 of the drawings, there is shown a lens 12 held in a lens frame 14. The lens frame 14 attaches to a frame mount 16, which is connectable to a light fixture such that the light source of the light fixture will be adjacent the lens 10. The frame mount 16 slides in a slot designed therefor, and can be moved axially so as to shift the position of the lens 12 relative to the light source, not shown in FIG. 1, to thereby move nearer to or further away from the light source. Such movement of the lens 12 will focus the light emanating from the light source in different ways so as to achieve a more concentrated beam or a more diffuse light, as mentioned above.

Figures 2A, 2B:
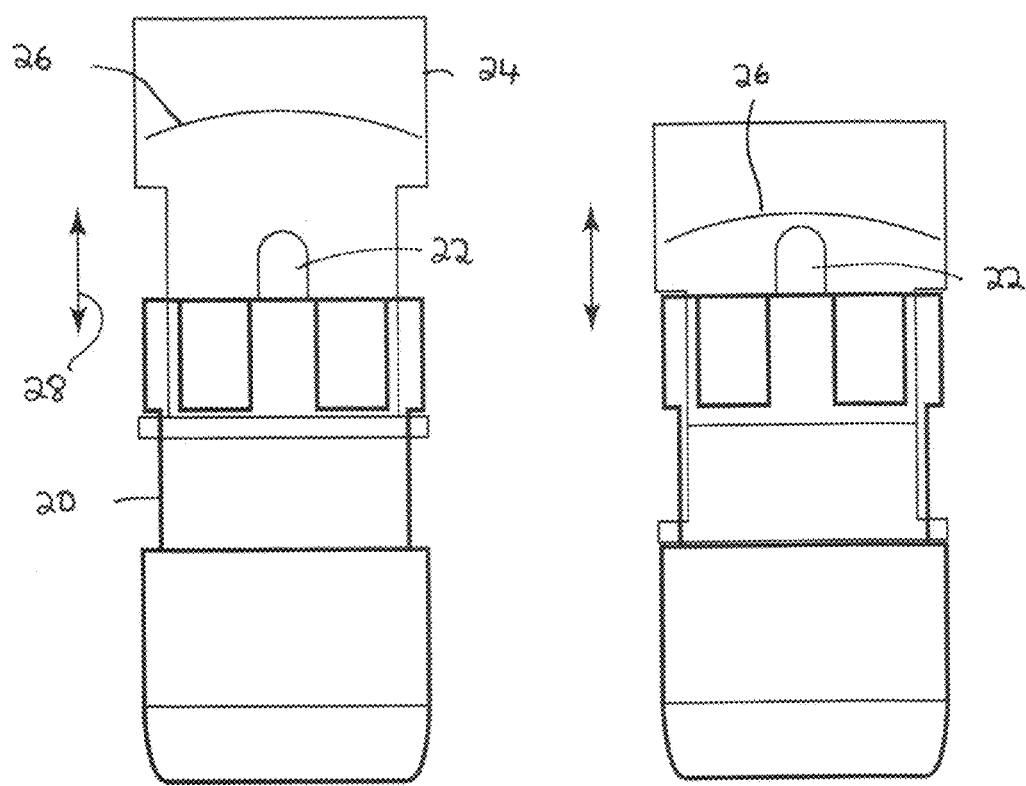
FIGS. 2A and 2B are side views of a lens and frame shown in a light fixture, in different positions with respect to the light source.

FIGS. 2A and 2B of the drawings show a light fixture 20 including a light source 22. The light fixture 20 receives a lens frame 24, which is able to slide over the designated portion of the light fixture 20. The lens frame 24 includes lens 26. FIG. 2A of the drawings shows the lens frame 24 in the position where the lens 26 is furthest away from the light source 22, while FIG. 2B shows the lens frame 24 in the position where the lens 26 is closest to the light source 22. The arrow 28 illustrates the axial movement of which the lens frame 24 is capable, and the lens frame 24 can of course be located at any position intermediate the extremities of those respectively shown in FIGS. 2A and 2B of the drawings.

Figure 3:
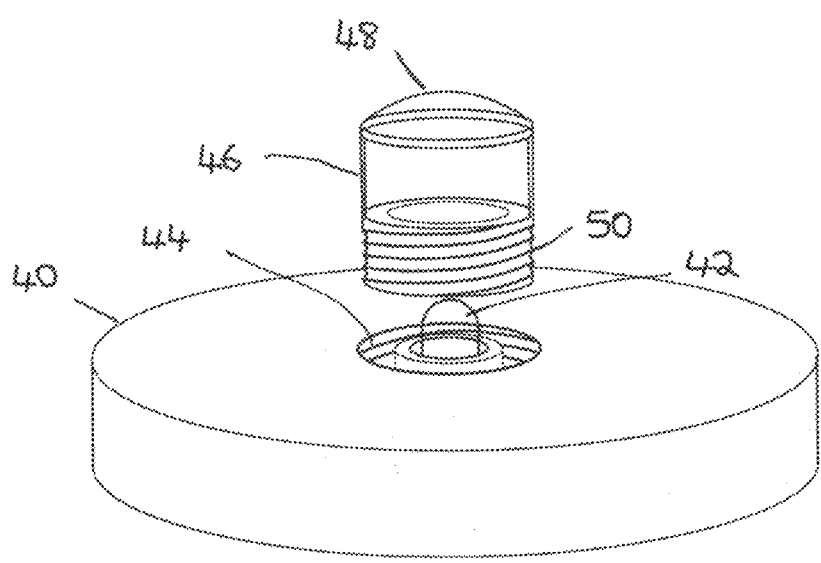
FIG. 3 is a perspective view of a lens, frame and part of a light fitting in accordance with another aspect of the invention.

FIG. 3 of the drawings shows a further embodiment of the invention including a light fixture 40 having a light source 42. The light fixture 40 is somewhat disk shaped. Around the light source 42 there is a threaded well 44. A lens frame 46 including a lens 48 is provided, the lens frame 46 including a lower threaded portion 50. The lower threaded portion 50 is received within the threaded well 44 and secured therein. Depending on how far into the threaded well 44 the lens frame 46 is screwed, the distance of the lens 48 from the light source 42 will vary, so that the focus of the light emanating from the light source can be more beam like, more diffuse and general, or something between these ranges.

Figure 4:
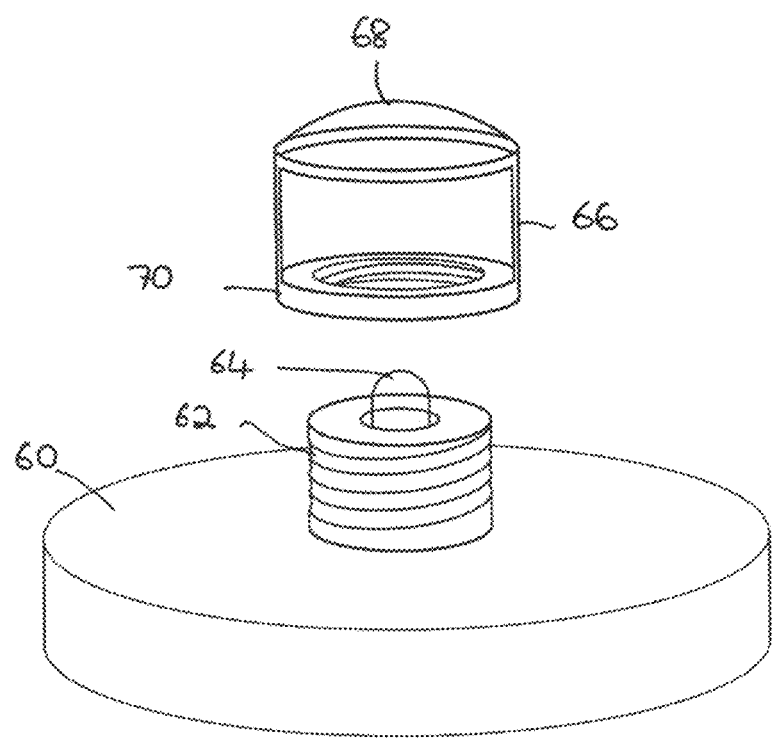
FIG. 4 is a perspective view of a lens, frame and part of a light fitting in accordance with yet a further aspect of the invention.

FIG. 4 of the drawings shows another light fixture with lens in accordance with the invention. A light fixture 60 of generally flat disk shape has extending from the upper surface thereof a threaded cylindrical portion 62. At the top of the cylindrical portion 62, there is located a light source 64. A frame 66 including a lens 68 and a base portion 70 is mounted on the cylindrical portion 62. The base portion 70 has thread corresponding to that on the cylindrical portion 62, so that appropriate rotation of the frame 66 on the cylindrical portion causes engagement therebetween. Furthermore, the extent to which the frame 66 is screwed onto the cylindrical portion 62 will determine the distance between the light source 64 and the lens 68. As already described, different distances between the lens 68 and the light source 64 will result in a change in the nature of the manner in which light is dispersed from the light fixture. Appropriate adjustment will therefore facilitate light dispersion between a more focused beam and a more general diffusion of light, as described.

Figures 5A, 5B:
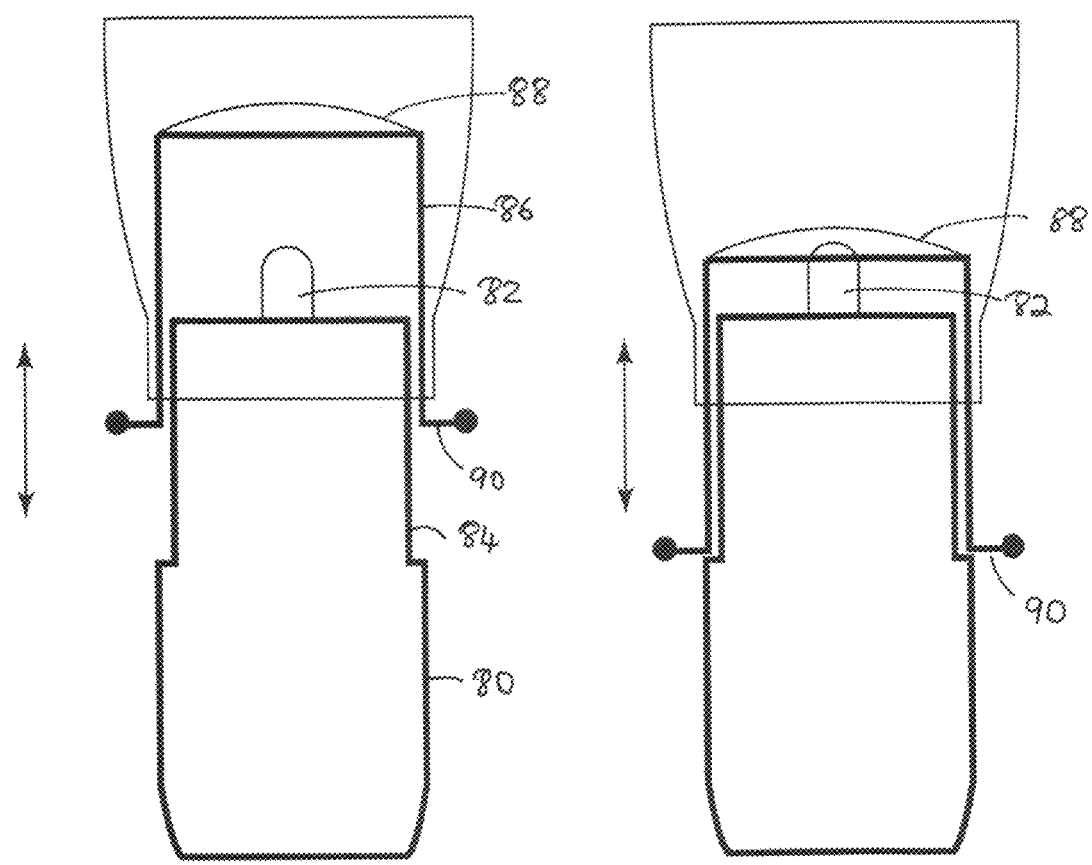
FIGS. 5A and 5B are side views of a lens and light fitting in accordance with a different embodiment of the present invention.

FIGS. 5A and 5B of the drawings show a further embodiment of the invention. A light fixture 80 including a light source 82 is provided. The light fixture 80 has a slightly narrower portion 84, which accommodates a lens frame 86 including a lens 88. The lens frame 86 has an upper portion in which the lens 88 is received, a mid-portion of generally cylindrical shape which straddles the narrower portion 84 of the light fixture 80, and a radially outwardly extending handle 90. As will be appreciated from a comparison of FIGS. 5A and 5B, the handle 90 may be manipulated to move the lens 88 away from the light source 82, as shown in FIG. 5A, or towards the light source 82 as shown in FIG. 5B. Once more, the lens 88 may be positioned relative to the light source 82 at any intermediate distance by appropriately manipulating the handle 90 and locating the lens frame 86 at the desired distance from the light source 82. In this way, a beam of light or diffuse light, or something therebetween, may be achieved.

FIGS. 6A and 6B show yet a further embodiment of the invention. There is provided a light fixture 100 having a light source 102. A lens frame 104 surrounds the light fixture 100, and has at its upper end a lens 106. At the opposite end, the lens frame 104 includes a handle 108, and the pulling and pushing of the handle 108 causes axial movement of the lens frame 104 to move the lens 106 toward or away from the light source 102. This effect is illustrated in these figures of the drawings, where FIG. 6A shows the lens 106 distanced from the light source 102, and where FIG. 6B shows the lens 106 much nearer the light source 102. The arrow 110 illustrates the direction of axial movement of the lens frame 104, achieved by appropriate manipulation of the handle 108. Once more, the embodiment shown in these figures may provide a light fixture which selectively provides a more focused beam or a more diffuse light which emanates therefrom, or something in between, as desired by the user.

Figure 7A:
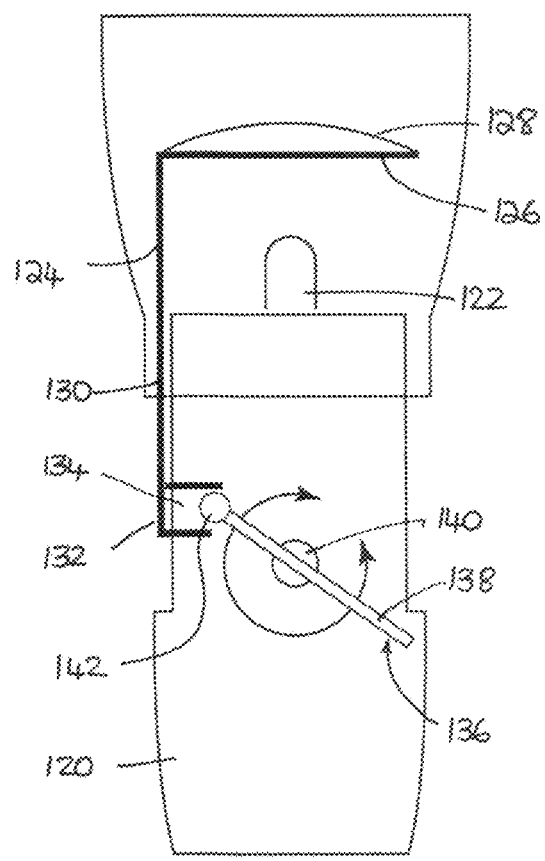
FIGS. 7A and 7B show a lens frame attached to a light fitting in accordance with a still further embodiment of the present invention.
Figure 7B:
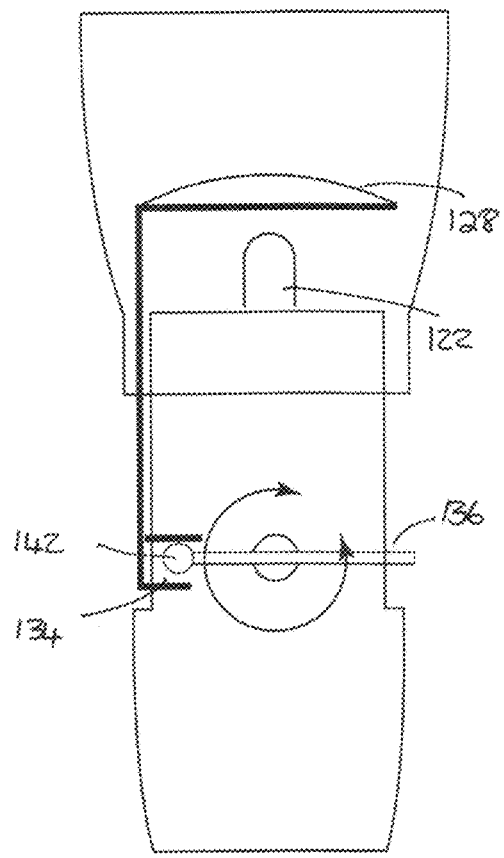

FIGS. 7A and 7B show yet a further embodiment of the invention, illustrating a light fixture 120 having a light source 122. A frame lens 124 is provided, and comprises an upper bracket 126 which supports a lens 128, an arm 130, and a base portion 132 which defines a space 134. On the body of the light fixture 120, there is provided an adjustment lever 136 consisting of a rotatable arm 138 mounted about a pivot 140. The end 142 of the rotatable arm 138 engages in the space 132. Appropriate rotation of the rotatable arm 138 causes the lens frame 124 to move axially up and down, toward and away from the light source 122 respectively. FIG. 7A shows a configuration where the lens 128 is spaced a distance away from the light source 122, while FIG. 7B shows the configuration where the lens 128 is closer to the light source 122. The lens may be located at any point therebetween. This is accomplished by turning the rotatable arm 138 about the pivot 140 until the lens 128 is at the desired distance from the light source 122 to provide the type of light as desired.

Figures 8A, 8B:
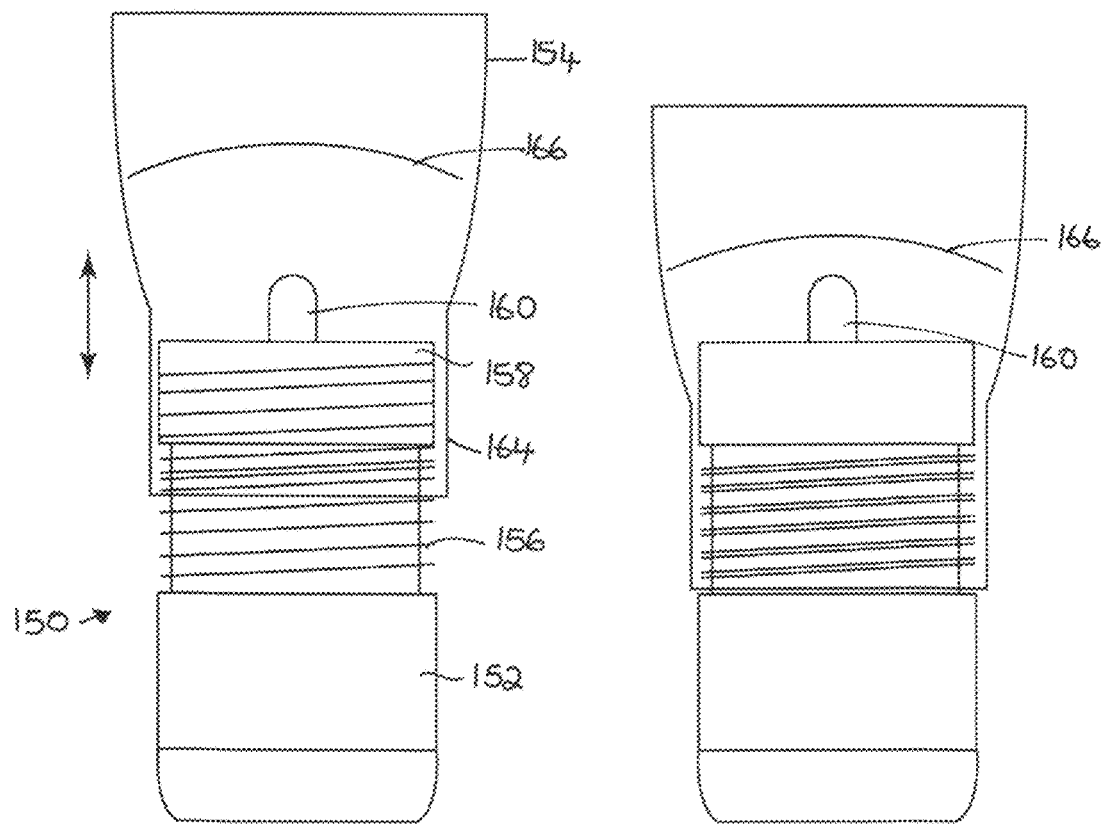
FIGS. 8A and 8B show yet another embodiment of the invention for providing a lens and frame onto a light fixture or fitting.

FIGS. 8A and 8B show yet a further embodiment of the invention. A light fixture 150 comprises a base housing 152 and a fixture shade 154 which can be attached thereto. The base housing 152 includes a cylindrical threaded portion 156, and a top surface 158 upon which is mounted a light source 160. The cylindrical threaded portion 156 has a male threaded portion. The fixture shade 154 includes a shade base 164 having an internal or female thread and an outer portion. As will be seen from these figures, the light fixture shade 154 can be screwed onto the base housing 152 at their commonly threaded areas. The fixture shade 154 includes a lens 166. The further the fixture shade 154 is screwed onto the base housing 152, the nearer the lens 166 will be to the light source 160. Conversely, the less that the fixture shade 154 is screwed onto the base housing 152, the more distant the lens 166 will be from the light source 160. The situation is in fact illustrated in FIGS. 8B and 8A respectively. As such, by appropriate placement and manipulation of the fixture shade 154 on the base housing 152, the nature of the light emanating from the light fixture 150 can be appropriately adjusted and controlled so that it may selectively be anything between a more focused beam and a more diffuse light.

Figure 9A:
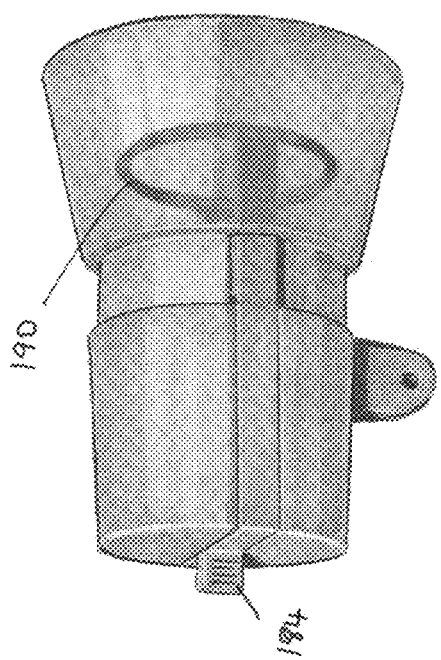
FIGS. 9A, 9B, 9C and 9D show a particular light fitting which may be used in the present invention including an integrated lens and frame constructed in accordance with the present invention.
Figure 9B:
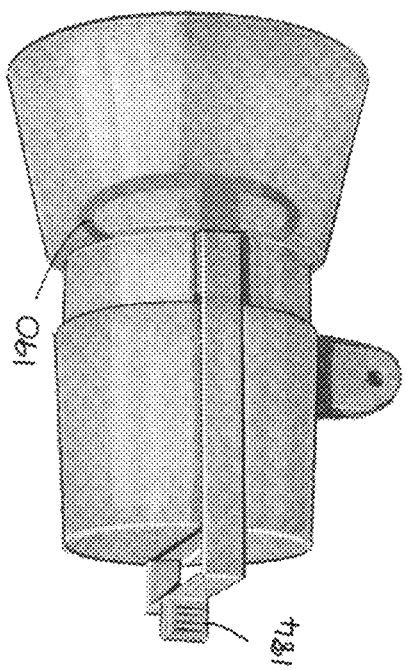
Figure 9C:
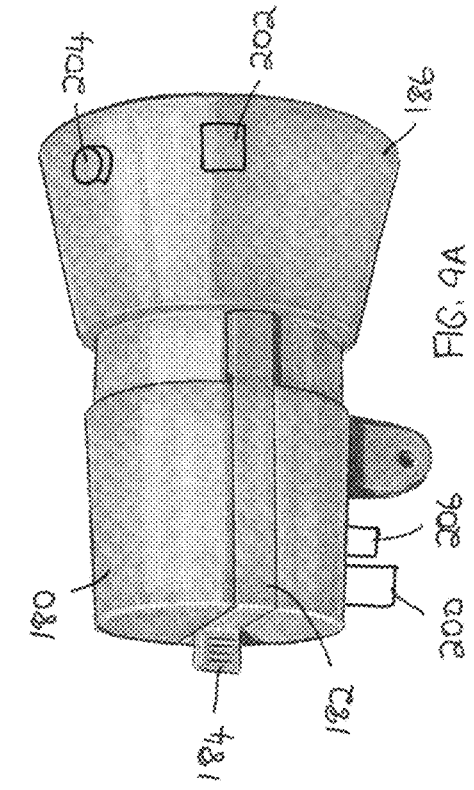
Figure 9D:
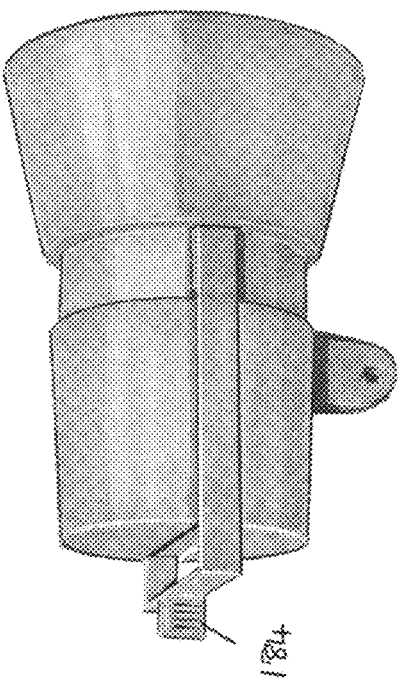

FIGS. 9A, 9B, 9C and 9D show another light fixture 180 of the present invention. FIGS. 9A and 9C show perspective side views, while FIGS. 9B and 9D R partially see-through to show the position of a lens in the light fixture at two respective positions. Part of the lens frame 182 with handle 184 can be seen mounted on the body 186 of the light fixture 180. The lens frame 182 can be moved axially back and forth, causing a lens 192 move closer to and further away respectively from the light source in the light fixture 180.

FIG. 10 of the drawings shows a light fitting 220 including a light source 222, a lens 224 and a reflector 226. The light source 222 is mounted on a threaded shaft 228, which has a rotatable knob 230. In this embodiment, rotation of the knob 230 has the effect of moving the light source 222 toward or away from the lens 224 to thereby adjust the nature of the beam emanating from the light fitting 220.

FIGS. 11 and 12 will now be briefly described. Although different embodiments from that shown in FIG. 10, similar corresponding reference numerals are used for the sake of convenience and more easily distinguishing and comparing each of the embodiments shown in FIGS. 10, 11 and 12.

FIG. 11 of the drawings shows a light fitting 220 including a light source 222, a lens 224 and a reflector 226. The lens 224 is mounted on a threaded shaft 228, which has a rotatable knob 230. In this embodiment, rotation of the knob 230 has the effect of moving the lens 224 toward or away from the light source 222 to thereby adjust the nature of the beam emanating from the light fitting 220.

FIG. 12 of the drawings shows a light fitting 220 including a light source 222, a lens 224 and a reflector 226. The reflector 226 is mounted on a threaded shaft 228, which has a rotatable knob 230. In this embodiment, rotation of the knob 230 has the effect of moving the reflector 226 toward or away from the lens 224 and/or light source 222 to thereby adjust the nature of the beam emanating from the light fitting 220.

FIGS. 13A and 13B show a schematic representation of a light fixture 240 including a sliding button 242 and a slot 244 in which the sliding button 242 can move. The sliding button 242 is connected to the light source 246 so that appropriate movement of the sliding button 242 move the light source 246 nearer to, or further away from, the lens 248. FIGS. 14A and 14B show a similar arrangement, but one wherein the sliding button 242 is connected to the lens 248 to move it nearer to, or further away from, the light source 246. In FIGS. 15A and 15B, the sliding button is connected to the reflector 250 so as to move the reflector nearer to, or further away from, the light source 246. In all of these figures, appropriate movement of the sliding button 242 and the respective component to which it may be attached will have the effect of focusing or diffusing the light beam emanating from the light fixture, or anything intermediate these two allowable extremes.

Reference is now made to FIGS. 16 to 19 of the drawings which show a color changing light 300 in accordance with an aspect of the invention. The color changing light 300 may be one which has an adjustable focus mechanism as has been described in detail above, or it may simply be a lamp with color changing capabilities, as will be described, without the necessity for structural components needed for an adjustable focus or other features.

Figure 16:
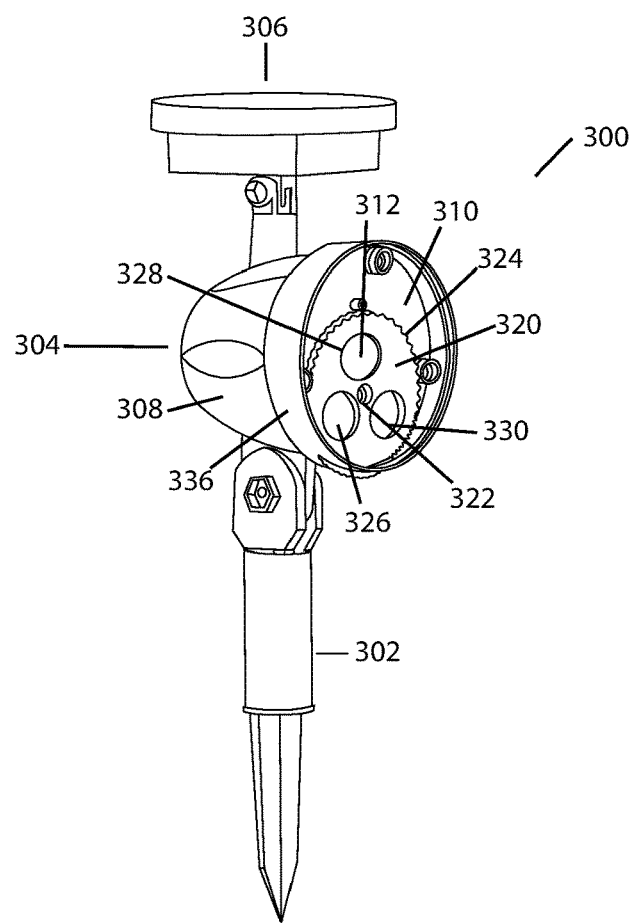
FIG. 16 is a front perspective view of a focus light in accordance with the invention illustrating the color changing components.
Figure 17:
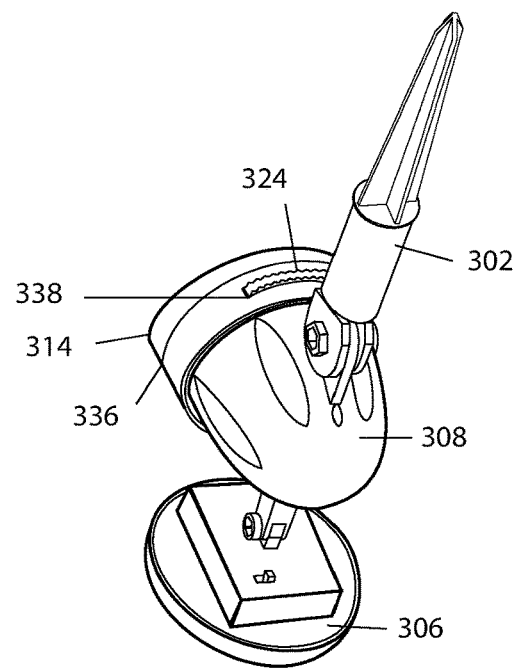
FIG. 17 is a rear and bottom perspective view of a focus light of the invention generally as shown in FIG. 16 of the drawings.
Figure 18:
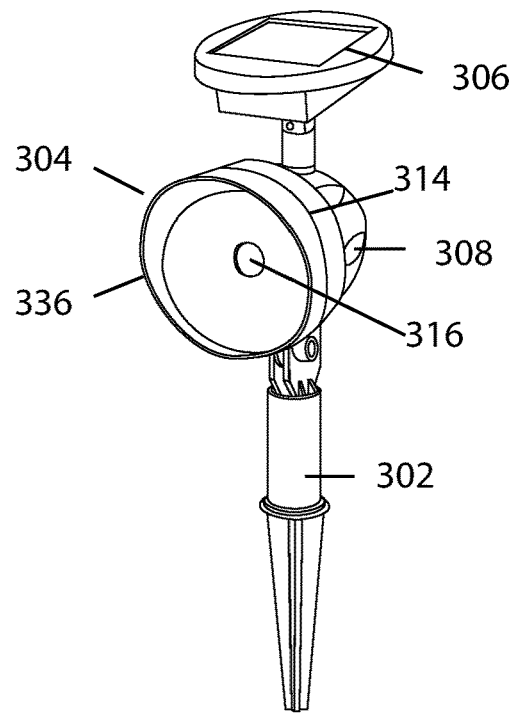
FIG. 18 is a front perspective view of a focus light of the invention generally as shown in FIG. 16, including a cover or hood.
Figure 19:
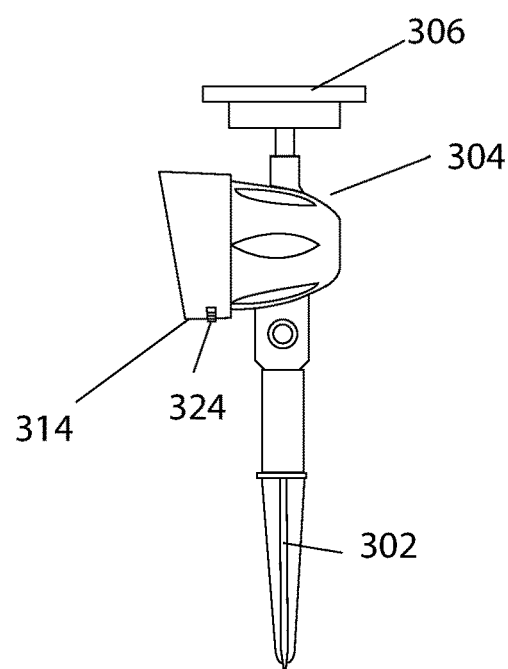
FIG. 19 is a side view of the focus light in accordance with the invention showing one particular embodiment of the invention.

In FIG. 16 of the drawings, there is shown a color changing light 300 comprising a support stem 302, a light 304 mounted on the stem 302, preferably in a way which may be movable or capable of tilting, and a solar energy collector 306 mounted at the top of the stem 302. As will be appreciated, the solar energy collector 306 absorbs solar energy in daylight hours and stores it as energy which can be used by the light 304. The light 304 comprises a housing 308 in which the illumination source, not shown, and other hardware may be accommodated. Such hardware may include rechargeable batteries which are electrically connected to the solar energy collector 306, and which are charged during sunny daylight hours. Hardware may also include processors, small motors for operating the light 300, motion detectors, ambient light detectors so that the light will only come on one a certain level of darkness has occurred, to name some examples only without being definitive of the variety of hardware that can be included.

The light 304 has the housing 308 thereof closed off by means of a front panel 310. The front panel 310 has a lens or aperture 312, and the illumination source within the housing 308 shines light through the lens or aperture 312 in either a spot, spread, or interim condition. The housing 308 is preferably covered and protected by means of a hood or cover 314, which in one embodiment may be easily removable in a snap fit connection or other form of attachment so that servicing and maintenance of any hardware within the housing 308 can be effectively and efficiently carried out. The hood 314 has a central aperture 316, which may include a lens, and in one embodiment of the invention, the position of the hood 314 and its lens may be adjustable so that the lens moves closer to or away from the lens or aperture 312 in the front panel 310, thereby enabling the light to be either focused in a beam, spread over an area, or something in between. Note that the ability to focus or un-focus a beam of light in the color changing light of the invention is one option, and the invention is not limited to a color changing light which necessary has focusing characteristics or can be focused in this way.

A color disc 320 is mounted on the front panel 310 of the housing 308. The color disc 320 is generally flat and circular in shape, and has a central mounting hole 322 by means of which it is fixed to the front panel 310. The peripheral edge 324 of the color disc 320 has a serrated or textured surface to facilitate rotation of the color disc 320 as will be described further below. The color disc 320 has three equi-spaced color filter apertures 326, 328 and 330. While three such color filter apertures are shown in the present embodiment, it will be appreciated that the invention is not limited to three apertures. Indeed, there may be fewer than three or more than three, depending upon how many colors are desired through which the illumination source will pass.

Each of the color filter apertures 326, 328 and 330 is generally circular in shape and approximately the same size as, or slightly bigger than, the lens or aperture 312 in the front panel 310 of the housing 308. Each of the three color filter apertures 326, 328 and 330 has a different color filter, such as blue, green and red, as examples only. Therefore, when the color disc 320 is rotated, a different aperture 326, 328 or 330 will be positioned in front of the lens or aperture 312. Depending upon the color of the filter which is formed within a particular aperture 326, 328 or 330, the illumination color given off by the light 304 will change accordingly.

The housing 308 has a front rim 336. The front rim 336 includes a slot 338. The edge of the color disc 320 extends a short distance through the slot 338. In this way, user access is provided whereby the color disc 320 can be manually rotated about its mounting a hole 322 from the outside of the housing 308 of the light 304 so that one of the apertures 326, 328 or 330, with its color filter, is positioned in front of the lens or aperture 312, enabling the user to select a desired color to be illuminated by the light 304.

The invention illustrated shows a manual mechanism for adjusting the color of the light dispersed from the light 304. However, an automated motor driven color disc may be provided which can be operated from the outside of the light 304, or even remotely through a wireless connection.

The color disc 320 may take other forms as well. It may be square or rectangular in shape, or in the form of a strip with the different colors arranged next to each other. Moreover, the various apertures may be close enough together so that appropriate positioning of the color disc 320 or other color changing mechanism may allow the light from the illumination source to partially shine through two or more apertures, thereby providing a different lighting effect.

The stem 302 may in one embodiment have at its lower portion a stake configuration so that the color changing light 300 may be placed removably in the ground. Further, the hood or cover 314 may be one which can be selectively changed, or where different lights 300 have different types of hoods 314, wherein one such good may simply allow transmission of the light from the housing 308 to the outside, while another such good may be provided with a lens of some type so that movement of the cover 314 or the lens contained therein may have the effect of focusing or un-focusing light between a narrower beam and a broader dispersion of light, as desired, or any intermediate position.

It will be appreciated that the present invention may have various other features and characteristics. For example, the lens frame may be associated with a motor, represented schematically by reference numeral 200 in FIG. 9A of the drawings, which is operable so that the lens can be spaced at the desired position other than by the direct operation of an individual. In one form, the motor may be operable by a remote control, represented schematically by reference numeral 202 in FIG. 9A of the drawings. In another form of the invention, the light fixture or lens frame may be fitted with some form of motion sensor, represented schematically by reference numeral 204 in FIG. 9A of the drawings. When the motion sensor detects movement, the light fitting may have a control unit, represented schematically by reference numeral 206 in FIG. 9A of the drawings, which may be programmed to adjust the nature of the light by shifting the position of the lens, or in other embodiments, the position of the light source or the reflector, or a combination of two or more of these components. For example, the light fixture may generally shine a focused beam to illuminate a selected feature of a house or garden. However, when movement is detected, the lens may be moved in response thereto so as to provide a more diffuse or floodlit area to illuminate a pathway, for example, for the convenience of any person walking in that area. Many variations and possibilities of such an arrangement fall within the scope of are invention.

Any motor associated with the light fixture may have its own power source, or may share the power source with the light. The shared or individual power sources may be AC, battery, or solar energy power, or a combination of any two or more of these sources.

While several different embodiments showing various forms of association between the lens frame and the light fixture have been illustrated and described in the specification, the invention is not to be considered as limited to these methods of attachment. Any appropriate construction may be used within the scope of the invention which achieves the purpose of placing a lens adjacent a light source, and being able to selectively move the lens to multiple different positions relative to the light source in order to adjust the nature of the light provided by the light fixture. As already mentioned, the invention applies equally to a light source which is movable, or to a reflector which is movable, or to a combination thereof which may be independently movable with respect to each other.

The light fixture may be used indoors or outdoors, and may be powered by an AC power source, batteries, or solar energy. Of course, outdoor light fittings are more amenable to capture solar energy, and such an energy source would therefore be a desirable option in that context. Solar powered lighting devices in various embodiments of the present invention may also have alternative or additional power sources.

Other variations of the lighting device also fall within the scope of the invention. Thus, for example, a light fitting in accordance with the invention may have multiple light sources, some or all of which light sources are subject to the effects of the adjustable lens position as described above. Thus, one light source may be associated with the lens, while another will not. Moreover, if multiple light sources in a given fixture each have lenses associated therewith, each lens may be independently adjustable so that the light fixture may provide different variations of focused and diffused light.

The invention is not limited to the precise constructional details described. Any fixture having the parts and components which allow the nature of the light from a light source to be altered by associating a movable lens there with, and any mechanism for constructing such a fixture, will full within the scope of the present invention.

Throughout this description, the embodiments and examples shown should be considered as exemplars, rather than limitations on the apparatus and procedures disclosed or claimed. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A light fixture comprising:
   a housing;
   a light source located adjacent a reflector on or in the housing,
   a lens frame mounted substantially outside of the housing and movable relative to the housing,
   a lens on the lens frame,
   an adjustment member on the lens frame,
   a movable plate comprising at least two apertures each having a color filter in at least a portion of the aperture, the movable plate being movable so that one aperture thereof is selectively associated with the lens, and
   the lens frame being movable relative to the housing by the adjustment member between a first position in which the lens is nearer the light source and reflector and a second position in which the lens is further away from the light source and reflector, wherein light produced by the light fixture is more focused or more diffuse according to the relative positions of the lens and the reflector and the light source.

2. A light fixture as claimed in claim 1 wherein the lens frame comprises an outer housing.

3. A light fixture as claimed in claim 1 wherein the movable plate comprises a circular disk rotatably mounted at its center whereby rotation of the circular disk facilitates selective placement of an aperture at the lens.

4. A light fixture as claimed in claim 1 wherein the circular disk comprises three apertures, each aperture having therein a filter of a different color.

5. A light fixture as claimed in claim 1 wherein the circular disk has a textured edge to facilitate manual rotation of the circular disk.

6. A light fixture as claimed in claim 5 wherein the lens frame comprises an outer housing having a slot therein, and a portion of the circular disk extends a short distance through the slot so that the circular disk can be rotated from outside of the outer housing.

7. A light fixture as claimed in claim 6 further comprising a fixing mechanism positioned so that a selected aperture is properly located in front of the lens.

8. A light fixture as claimed in claim 7 wherein the fixing mechanism comprises a projection and recess on the circular disk and lens frame.

9. A light fixture as claimed in claim 1 further comprising a motor for moving the movable plate so that a selected aperture is associated with the lens.

10. A light fixture as claimed in claim 9 wherein the motor is remotely operable so that the movable plate can be moved to a selected position from a remote location.

11. A light fixture as claimed in claim 9 further comprising a control circuit for activating the motor to move the movable plate so that a selected aperture is associated with the light source for a programmed period of time.

12. A light fixture as claimed in claim 1 wherein both the lens and the light source are movable relative to each other.

13. A light fixture as claimed in claim 1 wherein the lens is mounted in a lens frame, and the lens frame is movably mounted to a light housing, the light source being mounted on the light housing.

14. A light fixture as claimed in claim 1 wherein the lens frame is substantially cylindrical, the lens frame is mounted on a substantially cylindrical housing upon which the light source is mounted, the lens frame telescoping with respect to the cylindrical housing to facilitate an increase or decrease in the distance between the light source and the lens.

15. A light fixture as claimed in claim 1 comprising a plurality of light sources each of which may be independently and separately moved relative to the lens, and wherein one or more of the plurality of light sources may have a movable disk associated there with.

16. A light fixture as claimed in claim 1 having a solar power source.

\* \* \* \* \*